(12) United States Patent
Schramm

(10) Patent No.: US 6,834,159 B1
(45) Date of Patent: Dec. 21, 2004

(54) AIRCRAFT HEATED FLOOR PANEL

(75) Inventor: Kevin C. Schramm, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/652,627

(22) Filed: Aug. 31, 2000

Related U.S. Application Data

(60) Provisional application No. 60/153,335, filed on Sep. 10, 1999.

(51) Int. Cl.[7] .............................................. H05B 3/20
(52) U.S. Cl. ..................... 392/435; 219/213; 244/129.1
(58) Field of Search ................................ 392/435–439, 392/432; 219/530, 540, 213, 544; 244/129.1, 133; 428/116, 118

(56) References Cited

U.S. PATENT DOCUMENTS

| | | | |
|---|---|---|---|
| 2,512,875 A | * 6/1950 | Reynolds | 392/435 |
| 2,599,059 A | 6/1952 | Jones | 244/134 |
| 2,634,361 A | 4/1953 | Reynolds | 219/34 |
| 2,952,761 A | 9/1960 | Smith-Johannsen | 219/19 |
| 2,992,317 A | 7/1961 | Hoffman | 219/46 |

(List continued on next page.)

FOREIGN PATENT DOCUMENTS

| | | | | |
|---|---|---|---|---|
| CA | 651075 | | 10/1962 | ................. 29/148 |
| CA | 721834 | * | 11/1965 | |
| CA | 2100548 | | 1/1994 | ............. B32B/3/12 |
| DE | 2 208 118 | | 8/1973 | ............. H05B/3/20 |
| DE | 24 49 676 | | 4/1976 | ............. H05B/3/28 |
| DE | 39 22 465 A1 | | 1/1990 | ............. H05B/3/20 |
| EP | 0147627 A2 | | 7/1985 | ............. H05B/3/06 |
| EP | 1046576 | | 10/2000 | ............. B64C/1/18 |
| GB | 586886 | | 4/1947 | |
| GB | 635233 | | 4/1950 | |
| GB | 646940 | | 11/1950 | |
| GB | 863928 | | 3/1961 | |
| GB | 2244194 | | 11/1991 | |
| JP | 63-161328 | | 7/1988 | ........... F21D/13/02 |
| JP | 2-61435 | | 3/1990 | ........... F24D/13/02 |
| JP | 3-180337 | * | 8/1991 | |
| JP | 4-136630 | | 5/1992 | ........... F24D/13/02 |
| JP | 4-254119 | | 9/1992 | ........... F24D/13/02 |
| JP | 4-264382 | | 9/1992 | ............. H05B/3/14 |
| JP | 7-032518 | | 3/1995 | ............. B32B/3/12 |
| JP | 8064351 | | 3/1996 | ............. H05B/3/20 |
| JP | 8-306472 | * | 11/1996 | |
| JP | 9-202130 | * | 8/1997 | |
| WO | 01/17850 A1 | | 3/2001 | ............. B64C/1/18 |

OTHER PUBLICATIONS

"New Carbon Composite Material Developed," Flight International, pp. 988–989, Apr. 17, 1982.*

Primary Examiner—John A. Jeffery
(74) Attorney, Agent, or Firm—Renner, Otto, Boisselle & Sklar, LLP

(57) ABSTRACT

An aircraft floor panel (10) comprising a plurality of layers (18) cured together to form a lower support level (20) and an upper heater level (22), and a metal face sheet (16) for protecting the underlying layers (18) from floor-traffic related damage. A pressure sensitive adhesive (32) (or other adhesive which retains elasticity after bonding) is used to bond the metal face sheet (16) to the underlying support/heater layers (18) so that the different rates of thermal expansion can be accommodated during curing and cooling steps of the manufacturing process.

25 Claims, 2 Drawing Sheets

U.S. PATENT DOCUMENTS

| | | | | |
|---|---|---|---|---|
| 3,465,121 A | * | 9/1969 | Clark | 392/435 |
| 3,664,013 A | | 5/1972 | MacGuire | 29/611 |
| 3,697,728 A | | 10/1972 | Stirzenbecher | 219/548 |
| 3,961,157 A | | 6/1976 | Miller et al. | 219/345 |
| 3,973,103 A | | 8/1976 | Tadewald | 219/543 |
| 4,291,079 A | | 9/1981 | Hom | 428/116 |
| 4,374,312 A | * | 2/1983 | Damron | 392/435 |
| 4,386,749 A | | 6/1983 | Sweet et al. | 244/134 D |
| 4,557,961 A | | 12/1985 | Gorges | 428/117 |
| 4,598,007 A | | 7/1986 | Kourtides et al. | 428/116 |
| 4,606,959 A | * | 8/1986 | Hillinger | 428/116 |
| 4,733,057 A | | 3/1988 | Stanzel et al. | 219/548 |
| 4,759,964 A | | 7/1988 | Fischer et al. | 428/116 |
| 4,804,569 A | * | 2/1989 | Arisawa | 428/47 |
| 4,877,817 A | | 10/1989 | Tojo et al. | 521/142 |
| 4,967,057 A | | 10/1990 | Bayless et al. | 219/213 |
| 5,351,918 A | | 10/1994 | Giamati et al. | 244/134 D |
| 5,475,204 A | | 12/1995 | Giamati et al. | 219/548 |
| 5,518,796 A | | 5/1996 | Tsotsis | 428/116 |
| 5,667,866 A | | 9/1997 | Reese, Jr. | 428/116 |
| 5,851,336 A | | 12/1998 | Cundiff et al. | 156/272.2 |
| 5,973,506 A | | 10/1999 | Trimberger | 326/39 |
| 6,611,659 B2 | * | 8/2003 | Meisiek | 392/435 |
| 2002/0168184 A1 | * | 11/2002 | Meisiek | 392/435 |

* cited by examiner

AIRCRAFT HEATED FLOOR PANEL

This application claims the benefit of Provisional application Ser. No. 60/153,335, filed Sep. 10, 1999.

FIELD OF THE INVENTION

This invention relates generally to an aircraft heater floor panel and, more particularly, to an aircraft floor panel including a plurality of layers cured to form a lower support level, an upper heater level, and a top metal sheet for protecting the underlying layers from floor-traffic related damage.

BACKGROUND OF THE INVENTION

An aircraft will commonly include heated floor panels in order to maintain the cabin at a comfortable temperature. The floor panel is typically supported by an aircraft structure and has a structural integrity sufficient to support the weight of people and objects resting on top thereof. A metal face sheet typically forms the top surface of the panel to protect the underlying layers from punctures from high heels, chips from dropped objects, scratches from dragged luggage and/or other floor-traffic related hazards.

An aircraft heated floor panel is usually made by compiling a series of layers together to form a lower support level and an upper heater level. The lower support level may include, for example, a honeycomb layer surrounded by reinforcing fiber layers. The upper heater level may include, for example, a resistance element disposed in layers of a thermosettable dielectric material. High temperature film adhesives and scrims are appropriately provided between the layers and the compiled layers are cured at an elevated temperature (often in excess of about 250° F.) to form a composite structure.

The composite structure is then cooled to room temperature and the metal face sheet is secured to the previously cured layers in a separate manufacturing step. Specifically, for example, an epoxy cross-link adhesive may be used to bond the metal face sheet to the top of the heater. The secured metal face sheet may then be cut/trimmed to the correct size and an appropriate surface treatment (e.g., paint, primer, anodizing, etc.) may be applied.

SUMMARY OF THE INVENTION

The present invention provides an aircraft heated floor panel wherein the metal face sheet may be secured to the underlying composite structure during a high temperature curing step. In the past, this was not possible due to the differences in the thermal expansion rates between the support/heater layers and the metal layer. Specifically, at the high temperatures necessary to cure the support/heater layers, the metal face sheet would expand outwardly at a greater rate than the support/heater layers. If a high temperature film adhesive was used to secure the metal face sheet to the underlying support/heater layers, such an adhesive would lock the metal face sheet in this expanded condition. As the panel was subsequently cooled to room temperature, the bonded metal face sheet would attempt to contract inwardly thereby causing gross warping of the sheet.

More particularly, the present invention provides an aircraft floor panel comprising a plurality of layers cured together to form a lower support level and an upper heater level, a metal face sheet for protecting the top of the panel from floor-traffic related damage, and a pressure sensitive adhesive bonding the metal face sheet to the underlying support/heater layers. The support/heater layers together have a certain rate of thermal expansion and the face sheet has a different rate of thermal expansion. The pressure sensitive adhesive (or other adhesive which retains elasticity after bonding allows the different rates of thermal expansion to be accommodated during the curing and cooling steps of the manufacturing process.

In a method of making an aircraft heated floor panel according to the present invention, a layer of the adhesive is applied to the top of the heater level and the face sheet is placed thereon. The support/heater layers and the metal face sheet are then cured at an elevated curing temperature to form a composite structure whereby the face sheet expands at a different rate than the support/heater layers. When the composite structure is subsequently cooled to room temperature, the retained elasticity of the adhesive layer allows the face sheet to contract without warping or causing other damage thereto. To further streamline manufacturing procedures, the face sheet may be cut to a net shape prior and/or a surface treatment (e.g., primer, paint, etc.) may be applied prior to the curing step.

Thus, according to the present invention, a metal face sheet may be cured during the same step as the layers forming the lower support level and the upper heater level. The present invention eliminates the need for a separate bonding step for the metal face sheet and/or the need to perform this step at room temperature.

These and other features of the invention are fully described and particularly pointed out in the claims. The following descriptive annexed drawings set forth in detail certain illustrative embodiments of the invention, these embodiments being indicative of but a few of the various ways in which the principles of the invention may be employed.

DRAWINGS

DETAILED DESCRIPTION

Figure 1:
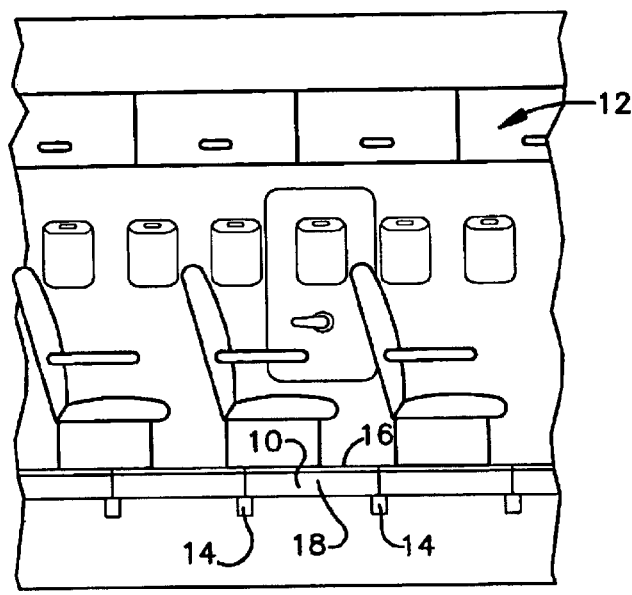
FIG. 1 is a schematic perspective view of an aircraft floor panel according to the present invention installed in an aircraft.

Referring now to the drawings, and initially to FIG. 1, a floor panel 10 according to the present invention is shown installed in an aircraft 12. The floor panel 10 is provided in order to maintain the aircraft cabin at a comfortable temperature and is supported around its perimeter by aircraft structure 14. A metal face sheet 16 (e.g., aluminum) forms the top surface of the panel 10 to protect the underlying layers 18 against punctures from high heels, chips from dropped objects, scratches from dragged luggage and/or other floor-traffic related hazards. As is explained in more detail below, the design of the floor panel 10 eliminates the need for a separate bonding step for the metal face sheet 16 and/or the need to perform this step at room temperature.

Figure 2:
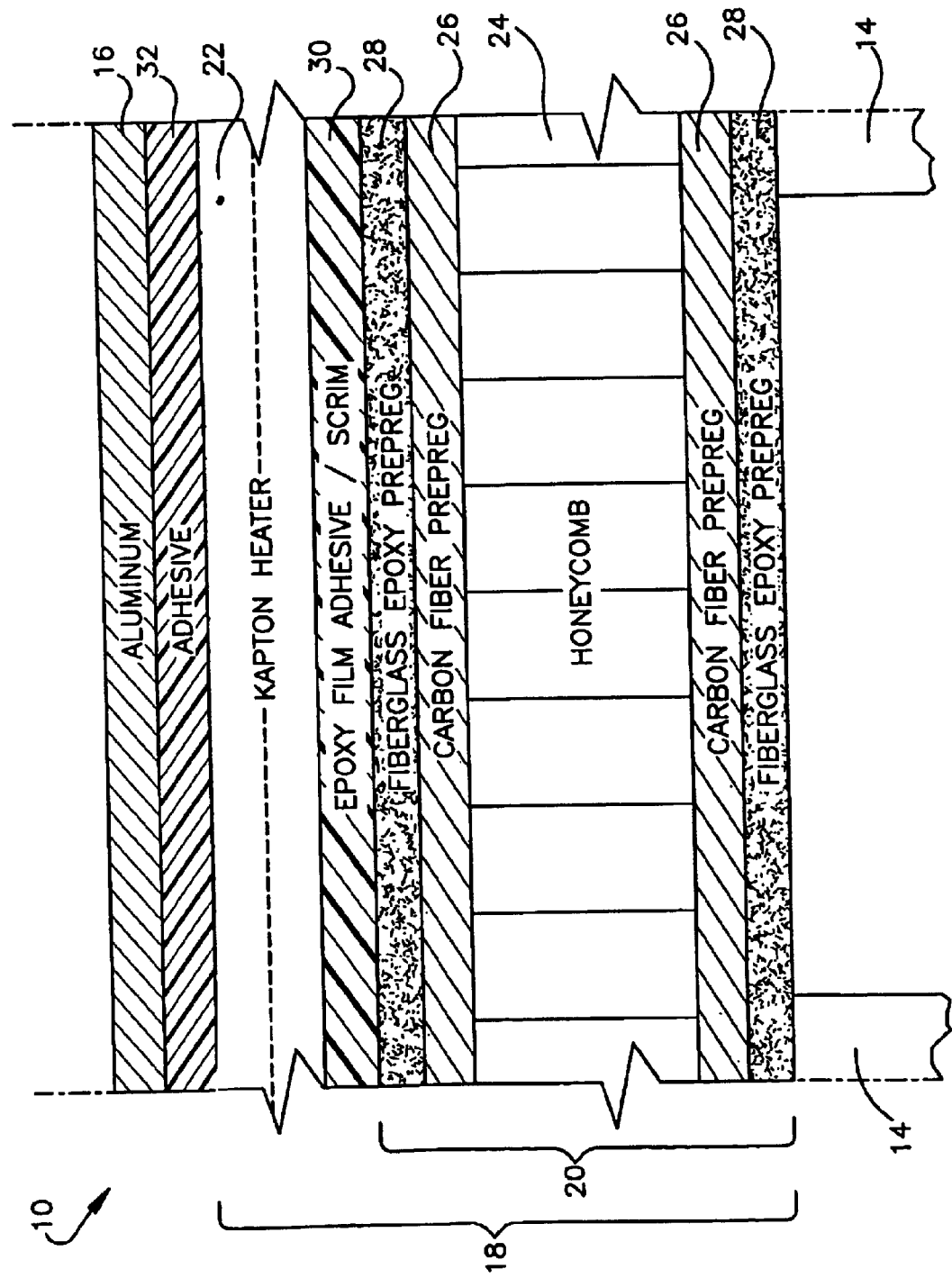
FIG. 2 is a cross sectional view of the aircraft floor panel according to the present invention.

Referring now additionally to FIG. 2, the underlying layers 18 of the panel 10 form a lower support level 20 and an upper heater level 22. The support level 20 may be formed from a honeycomb layer 24 (e.g., aramid) sandwiched between fiber layers 26 (e.g. carbon fiber prepreg) and fiber layers 28 (e.g., fiberglass epoxy prepreg). Additional and different support layers which provide the sufficient stiffness, satisfy the thickness limitations, and accommodate weight considerations may be used.

The heater level 22 may be an electrothermal heater, that is it may comprise an electrically resistive element electrically isolated in a dielectric. The element may be an etched foil type element or a wire and/or the element may be configured in a zig-zag type arrangement. The element may be isolated by encapsulation by disposing it between plies of an appropriate curable material such as thermoset plastic or any other dielectric or electrically non-conductive material. For example, the plies may be made of a polyamide film, such as Kapton® available from the E. I. Dupont DeNeumours Company.

The underlying layers 18 may include an adhesive layer 30 between the support level 20 and the heater level 22. The adhesive may be a film adhesive (e.g., epoxy) and should be capable of withstanding elevated curing temperatures so that, during the curing process, the layer 30 will facilitate the bonding of the support level 20 to the heater level 22. The adhesive layer 30 may incorporate a scrim if necessary or desired for better distribution of the adhesive.

The floor panel 10 includes an adhesive layer 32 between the underlying layers 18 and the metal face sheet 16. According to the present invention, this adhesive layer 32 is an adhesive which retains elasticity after bonding, specifically a pressure sensitive adhesive (PSA) which is activated by the application of pressure and which performs appropriately during elevated curing temperatures. Suitable pressure sensitive adhesives include acrylic pressure sensitive adhesives (e.g., catalog number F-9473PC available from Minnesota Mining and Manufacturing Company, St. Paul, Minn., USA.) Primers may be used to enhance the bonding characteristics of the adhesive.

Figure 3A:
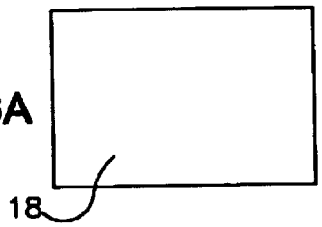
FIGS. 3A-3F are schematic views of a method of making the aircraft floor panel according to the present invention.
Figure 3B:
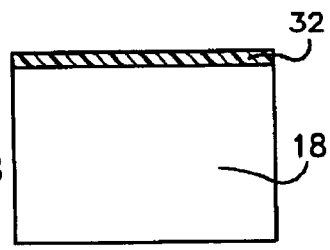
Figure 3C:
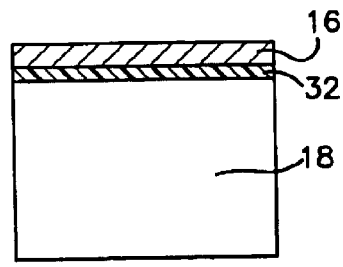
Figure 3D:
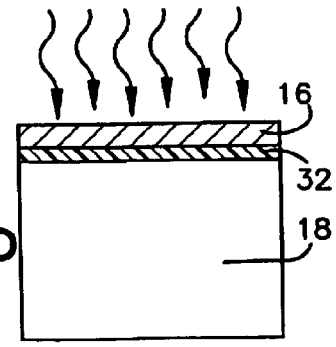
Figure 3E:
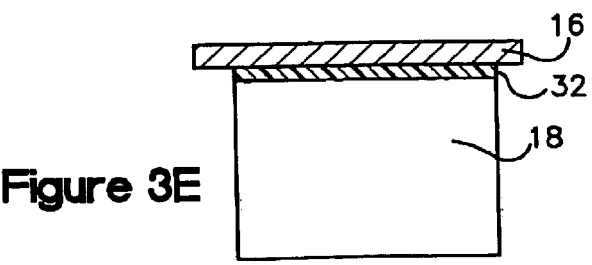
Figure 3F:
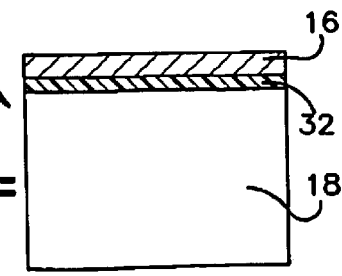

A method of making the floor panel 10 according to the present invention is schematically shown in FIGS. 3A-3F. Initially, the layers 18 of the lower support level 20 and the upper heater level 22 are compiled. (FIG. 3A.) The pressure sensitive adhesive layer 32 is then applied to the top surface (FIG. 3B) and the metal face sheet 16 placed on top of the layer 32 (FIG. 3C). The support/heater layers 18 are then subjected to a curing process at an elevated temperature (e.g., in excess of about 250° F.) and, at the same time, pressure may be applied to activate the pressure sensitive adhesive layer 32. (FIG. 3D.) During the heat curing, the metal face plate 16 expands outwardly due to the differences in the thermal expansion rates between the support/heater layers 18 and the metal sheet 16. (FIG. 3E.) As the panel 10 is subsequently cooled to room temperature (e.g., heat is removed and the panel is allowed to cool), the retained elasticity of the adhesive layer 32 allows the bonded metal face sheet 16 to contract inwardly without warping. (FIG. 3F.)

Additional manufacturing steps can be streamlined as well. For example, the metal face sheet 16 can be cut to a net shape and treated with the appropriate surface treatment and then bonded to the other layers 18 in one step.

Because pressure sensitive adhesives retain elasticity after bonding, the metal face sheet 16 is allowed to contract inwardly as the panel 10 is cooled to room temperature. Additionally, the thickness of the pressure sensitive adhesive layer 32 may be varied to accommodate different curing temperatures. Generally, the greater the thickness, the higher curing temperature that may be used. For example, a thickness of 0.010 inch would correspond to a curing temperature of about 280° F.

One may now appreciate that the use of the elastic bonding layer 32 between the metal face sheet 16 and the support/heater layers 18 allows cocuring of the respective materials notwithstanding their differing coefficients of thermal expansion. This eliminates the need for a separate bonding step for the metal face sheet 16 and/or the need to perform this step at room temperature.

Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. An aircraft heated floor panel, comprising:
 a plurality of layers cured together to form a lower support level and an upper heater level;
 a metal face sheet for protecting the top of the panel from floor-traffic related damage; and
 a pressure sensitive adhesive bonding the metal face sheet to the underlying support/heater layers.

2. An aircraft heated floor panel as set forth in claim 1, wherein the support layer includes a honeycomb layer sandwiched between fiber layers.

3. An aircraft heated floor panel as set forth in claim 1, wherein the heater level comprises a resistive element encapsulated in cured thermoset plastic plies.

4. An aircraft heated floor panel as set forth in claim 1, wherein the metal face sheet is made of a metal selected from aluminum, titanium, steel, or stainless steel.

5. An aircraft heated floor panel as set forth in claim 1, wherein the support layer includes a honeycomb layer sandwiched between fiber layers, the heater level comprises a resistive element encapsulated in cured thermoset plastic plies, and the metal face sheet is made of aluminum.

6. An aircraft heated floor panel as set forth in claim 1, wherein the underlying support/heater layers include a high temperature curing adhesive layer between the support level and the heater level.

7. An aircraft heated floor panel as set forth in claim 1, wherein the pressure sensitive adhesive is an acrylic pressure sensitive adhesive.

8. An aircraft heated floor panel as set forth in claim 1, wherein the pressure sensitive adhesive is a rubber pressure sensitive adhesive.

9. An aircraft heated floor panel as set forth in claim 1, further comprising a primer to enhance the bonding characteristics of the adhesive.

10. In combination, an aircraft and the aircraft heated floor panel of claim 1, wherein the perimeter of the lower support level is supported by a structure of the aircraft.

11. A method of making the aircraft heated floor panel of claim 1, said method comprising the steps of:
 applying a layer of the pressure sensitive adhesive to the top of the heater level,
 placing the metal face sheet on top of the adhesive layer,
 curing the support/heater layers and the metal face sheet at an elevated curing temperature, and
 cooling the cured layers and the metal face sheet to an ambient temperature;
 wherein the pressure sensitive adhesive layer allows the metal face sheet to expand and contract at a different thermal expansion rate than the support/heater layers during the curing and cooling steps.

12. A method as forth in claim 11, wherein the curing temperature is at least about 250° F.

13. A method as set forth in claim 11, wherein the layer of the pressure sensitive adhesive is about 0.010 inch and wherein the curing temperature is about 280° F.

14. A method as set forth in claim 11, wherein the face sheet is out to net shape prior to the curing step.

15. A method as set forth in claim 11, wherein a surface treatment is applied to the face sheet prior to the curing step.

16. An aircraft heated floor panel, comprising:

a plurality of layers cured together to form a lower support level and an upper heater level, these support/heater layers together having a certain rate of thermal expansion;

a face sheet for protecting the top of the panel from floor-traffic related damage, the face sheet having a different rate of thermal expansion than the underlying support/heater layers; and an elastic adhesive bonding the face sheet to the underlying support/heater layers whereby the different rates of thermal expansion may be accommodated during curing procedures.

17. An aircraft heated floor panel as set forth in claim 16, wherein the face sheet has a higher rate of thermal expansion than the underlying support/heater layers.

18. An aircraft heated floor panel as set forth in claim 17, wherein the face sheet is made of metal.

19. An aircraft heated floor panel as set forth in claim 18, wherein the metal is selected from aluminum, titanium, steel, or stainless steel.

20. An aircraft heated floor panel as set forth in claim 18, wherein the elastic bonding adhesive is a pressure sensitive adhesive.

21. An aircraft heated floor panel as set forth in claim 20, wherein the pressure sensitive adhesive is an acrylic pressure sensitive adhesive.

22. An aircraft heated floor panel as set forth in claim 20, wherein the pressure sensitive adhesive is a rubber pressure sensitive adhesive.

23. A method of making the aircraft heated floor panel of claim 16, said method comprising the steps of:

applying a layer of the elastic bonding adhesive to the top of the heater level;

placing the face sheet on top of the adhesive layer;

curing the support/heater layers and the face sheet at an elevated curing temperature to form a composite structure; and cooling the composite structure to an ambient temperature;

wherein the elastic bonding adhesive layer allows the face sheet to expand and contract at a different thermal expansion rate than the support/heater layers during the curing and cooling steps.

24. A method as set forth in claim 23, wherein the face sheet is cut to net shape prior to the curing step.

25. A method as set forth in claim 23, wherein a surface treatment is applied to the face sheet prior to the curing step.

* * * * *

UNITED STATES PATENT AND TRADEMARK OFFICE
CERTIFICATE OF CORRECTION

PATENT NO. : 6,834,159 B1
DATED : December 21, 2004
INVENTOR(S) : Kevin C. Schramm It is certified that error appears in the above-identified patent and that said Letters Patent is hereby corrected as shown below:

Column 4,
Lines 16-24, delete entirety and add the following:
　　　1. An aircraft heated floor panel, comprising:
　a plurality of layers cured together to form a lower support level and an upper heater level;
　a metal face sheet for protecting the top of the panel from floor-traffic related damage; and
　a pressure sensitive adhesive bonding the metal face sheet to the underlying support/heater layers;
　wherein the pressure sensitive adhesive retains elasticity after bonding and performs during elevated curing temperatures in excess of about 250° F.

Column 5,
Line 5, "out" should read -- cut --.
Lines 7-19, delete and add the following:
　　　16. An aircraft heated floor panel, comprising:
　a plurality of layers cured together to form a lower support level and an upper heater level, these support/heater layers together having a certain rate of thermal expansion;
　a face sheet for protecting the top of the panel from floor-traffic related damage, the face sheet having a different rate of thermal expansion than the underlying support/heater layers; and
　an elastic adhesive bonding the face sheet to the underlying support/heater layers whereby the different rates of thermal expansion may be accommodated during curing procedures;
　wherein the adhesive performs during elevated curing temperatures in excess of about 250° F.

Signed and Sealed this

Second Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,834,159 B1
DATED : December 21, 2004
INVENTOR(S) : Kevin C. Schramm It is certified that error appears in the above-identified patent and that said Letters Patent is hereby corrected as shown below:

Column 4,
Lines 16-22, delete and insert

1. An aircraft heated floor panel, comprising:

a plurality of layers cured together to form a lower support level and an upper heater level;

a metal face sheet for protecting the top of the panel from floor-traffic related damage; and a pressure sensitive adhesive bonding the metal face sheet to the underlying support/heater layers;

wherein the pressure sensitive adhesive retains elasticity after bonding and performs during elevated curing temperatures in excess of about 250° F.

Column 5,
Line 5, "out" should read -- cut --.
Lines 9-21, delete and insert

16. An aircraft heated floor panel, comprising:

a plurality of layers cured together to form a lower support level and an upper heater level, these support/heater layers together having a certain rate of thermal expansion;

a face sheet for protecting the top of the panel from floor-traffic related damage, the face sheet having a different rate of thermal expansion than the underlying support/heater layers; and an elastic adhesive bonding the face sheet to the underlying support/heater layers whereby the different rates of thermal expansion may be accommodated during curing procedures;

wherein the adhesive performs during elevated curing temperatures in excess of about 250° F.

Signed and Sealed this

Twenty-third Day of August, 2005

JON W. DUDAS
*Director of the United States Patent and Trademark Office*